May 31, 1938. J. R. CROSS 2,119,421
ELECTRIC COOKING UTENSIL
Filed Jan. 22, 1937
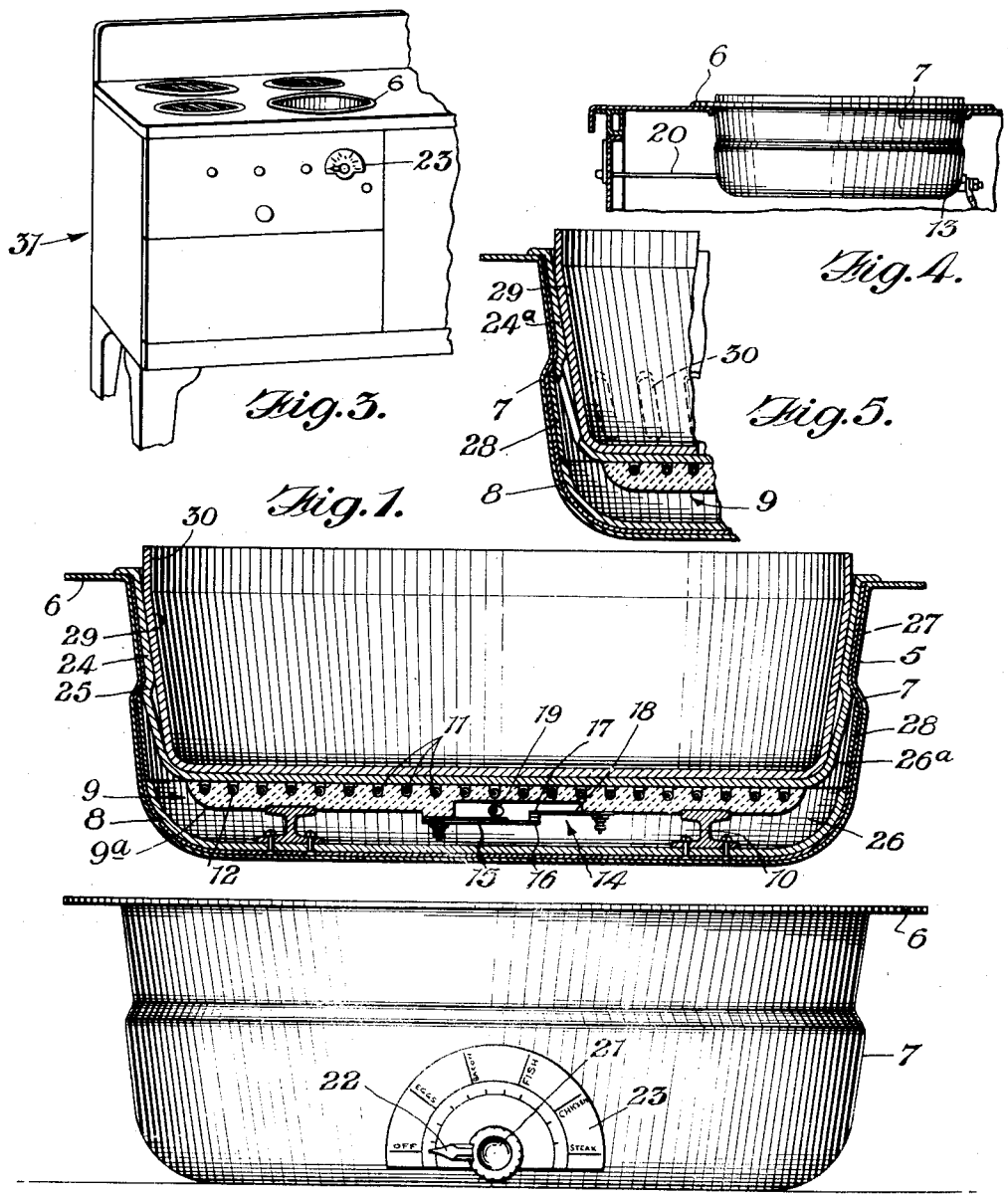

Patented May 31, 1938

2,119,421

UNITED STATES PATENT OFFICE 2,119,421

ELECTRIC COOKING UTENSIL

James R. Cross, St. Petersburg, Fla.

Application January 22, 1937, Serial No. 121,880

9 Claims. (Cl. 219—44)

This invention relates to electric cooking utensils broadly, and while not restricted thereto, is primarily concerned with an electric fryer, or a utensil in which frying of articles of food may be carried on in an efficient and convenient manner.

An object of the invention is to provide a utensil of this type wherein the heat from the heating element is utilized to its highest practical degree, or wherein the heat loss is reduced to a minimum, to thereby improve the efficiency of the utensil.

Another object of the invention is to provide an electric cooker or fryer wherein the parts are constructed in a manner such as to provide convenience in assembly and disassembly and thereby render the parts easily and quickly accessible for repair or cleaning, and wherein at the same time the parts may be manufactured at a relatively low cost.

Another object of the invention is to provide in a utensil of this type means for visibly indicating the most ideal temperature at which to fry or cook certain articles of food, to thereby avoid waste heat and food loss and ensure more palatable food.

The foregoing and other objects and advantages will become more apparent in view of the following description taken in conjunction with the drawing, wherein Fig. 1 is a substantially central transverse sectional view taken through an electric cooking or frying utensil embodying the features of the present invention.

Fig. 2 is a view in elevation thereof.

Fig. 3 is a fragmentary view in elevation of an electric range, illustrating how the improved utensil is adapted to be removably installed therein.

Fig. 4 is a fragmentary sectional view taken through a portion of Fig. 3.

Fig. 5 is a fragmentary sectional view of a modified form of cooking utensil or fryer.

Referring to the drawing in detail, the reference character 5 generally designates an outer shell or receptacle which may be made of suitable material, preferably metal. The shell 5 is formed with the flange 6 at the top thereof in order that it may be seated in the conventional seat or recess provided in electric ranges, and at an intermediate point said shell is formed with an annular offset or outwardly bulged portion 7.

Seated in the base of the outer shell or container 7 is a heat reflector 8, which may be made of any suitable material capable of reflecting heat in an efficient manner, and on this reflector a heating element generally indicated at 9 is supported by means of pedestals 10. The heating element 9 in the form herein shown comprises a refractory member 9a formed with a plurality of annular grooves or recesses 11 adapted to receive the conventional resistor coils 12. The electrical circuit for the heating element 9 includes terminals 13, note Fig. 4, connected in series with the ends of the resistor wires 11, and a thermostat switch generally indicated at 14 of Fig. 1. While any suitable type of thermostatic switch may be utilized, it is preferred to adopt the type herein illustrated and comprising a bimetallic element 15 suitably secured at its one end to the refractory plate 9a and at its opposite free end provided with a contact 16. The contact 16 is adapted to engage a coacting contact 17 mounted on the end of a suitable conducting strip 18 whose fixed end is suitably secured to the refractory plate 9a. The strips 15 and 18 are connected in series in the electrical circuit, and mounted within operative adjacency to the strip 15 is a cam 19 which is adjustably secured on the end of a control rod 20, note particularly Fig. 4. The rod 20 has fixed on the outer end thereof a control knob 21 provided with a suitable index hand 22. Strip 15 is normally urged under tension against the surface of cam 19. As will be understood, contact 16 will remain in engagement with the contact 17 over a period of time depending upon the temperature of the strip 15 and the adjustment of the cam member 19.

Through practical experimentation I have found that the temperature through which frying may be carried on for different articles of food may be gaged so that the food will be cooked in the best manner. With this in view, I have arranged the thermostat indicating plate 23 as shown in Fig. 2. Thus when the indicator hand 22 is adjusted to the type of food specified on the dial 23, the proper temperature at which that particular article of food may be fried or cooked will be obtained. It will be understood that these temperatures may be varied within certain limits to suit the individual tastes and methods of frying adapted by different people. This method not only facilitates the work of an experienced cook but also simplifies the procedure for a novice. Cheaper operation results since there is less waste heat and the food is saved from shrinkage losses due to unnecessarily high temperatures.

Within the outer shell 5 is mounted a liner 24 which is adapted to seat directly on the heating element 9 and is formed with an annular outwardly pressed portion defining a bead 25 adapted to engage the bulged-out portion 7 hereinbefore referred to. This liner 24 may be formed of suitable material, preferably metal and may be assembled in the outer shell 7 simply by pressing is downwardly until the bead 25 registers with 7, the metal being of such construction as to permit a certain amount of stretching or give to accommodate this arrangement. The reflector 8 is spaced from the heating element 9 providing a chamber 26 which reflects the heat upwardly into a communicating chamber 26a whose upper end is sealed at the points where the bead 25 engages in recess 7. Suitable insulating material 27 may be inserted between the outer shell 7 and inner liner 24, and in addition a further strip or band of insulation material 28 is inserted around the chamber 26a. By this means, the heat given off by the element 9 is uniformly distributed and utilized to its fullest possible extent and at the point where it is most effective in a utensil of this type.

A cooking or frying pan 29 is removably seated in the liner 24 and may be removed at will for washing or cleaning or for carrying the food from place to place. This pan at its upper end is slightly inset as at 30 to permit it to be inverted when it is desired to use the utensil as a small oven. If desired, a suitable handle, not shown, may be provided for the pan 29, or a detachable handle may be used of any well known type.

In Fig. 5 I have shown a modification wherein the liner 24a is provided with a series of openings or slots 30 whereby the heat reflected upwardly into the chamber 26a is applied directly against the sides of the pan 29. In a construction of this type, the heating action is more rapid and may perhaps be more fully utilized than in the construction shown in Fig. 1.

Figs. 3 and 4 show how the improved utensil may be seated in a conventional electric range, generally indicated at 31, the indicator plate 23 being secured in any suitable manner on the front face of the range and the rod 20 projecting outwardly thereto. It will be understood of course that where the utensil is used separately the plate 23 may be applied directly on the side of the utensil and the rod 20 shortened.

The ease with which the parts may be assembled or taken apart for the purpose of cleaning or repair will be obvious, the pan 29 being removable from the liner 24, and the latter being removable under suitable pressure from the outer shell 7. When the outer shell is removed the element 9 is readily accessible for repairs. Not only is convenience in assemblage and disassemblage provided, but the parts may be economically manufactured so that the improved utensil may be sold at a relatively low price.

It will be understood that certain changes in construction and design may be adopted within the scope of the invention as defined by the appended claims.

I claim:

1. An electric cooking utensil having inner and outer walls and a heating element disposed beneath the bottom of the inner wall, a separate heat reflecting member overlying the bottom of the outer wall beneath said heating element, there being a space formed between the heating element and reflector and said space extending upwardly around the sides of the inner wall of the utensil to thereby provide a heating chamber around said latter wall.

2. An electric cooking utensil comprising an outer shell, an inner liner, a heating element disposed in the base of said outer shell beneath said liner, a separate heat reflecting member overlying the bottom of the outer shell beneath said heating element, there being a space formed between the heating element and said member and a chamber between the lower side walls of said outer shell and said inner liner in communication with said space, said shell and liner being constructed to seal the upper end of said chamber.

3. An electric cooking utensil comprising an outer shell having a heat reflecting element formed with a generally concavo-convex reflecting surface disposed in the bottom thereof, an inner liner inserted in said outer shell, a heating element disposed beneath said liner and supported in spaced relation with respect to said heat reflecting member, said liner and outer shell having a chamber formed between the lower side walls thereof whereby the heat reflected from said member is pocketed in said chamber, and means for insulating the outer shell against heat loss from said chamber.

4. An electric cooking utensil comprising an outer shell having an outwardly bulged portion in the side wall thereof, an inner liner having a bead adapted to register with said outwardly bulged portion when the liner is assembled under pressure in the shell, the walls of said inner liner and outer shell being spaced from one another beginning at a point adjacent said bead and extending downwardly to the bottom portion of the utensil, a heating element disposed in said space beneath the inner liner, and means in the form of a separate heat-reflecting element overlying said bottom portion for reflecting heat given off by said element upwardly into said space.

5. An electric cooking utensil comprising an outer shell, an inner liner detachably engaged in said outer shell, an electric heating element disposed beneath the inner liner, and a frying pan removably telescoped in said inner liner.

6. An electric cooking utensil comprising an outer shell, an inner liner detachably engaged in said outer shell, an electric heating element disposed beneath the inner liner, and a frying pan removably disposed in said inner liner, said frying pan being constructed so that it may be inverted and have its open top portion partially telescoped in said liner and thereby convert the utensil into a small oven.

7. An electric cooking utensil comprising an outer shell having a generally dish-shaped heat reflecting member disposed in the bottom thereof, a refractory heating element supported on said reflector and in spaced relation thereto, an inner liner disposed in said outer shell and having its bottom resting on said heating element, there being a chamber formed between the outer shell and the inner liner around the bottom portion of the latter, whereby the heat reflected by said member is conducted upwardly into said chamber, and a pan removably disposed in said liner with its bottom wall substantially in contact with the bottom wall of the liner.

8. An electric cooking utensil comprising an outer shell having a heat reflecting member disposed in the bottom thereof, a refractory heating element supported on said reflector and in spaced relation thereto, an inner liner disposed in said outer shell and having its bottom resting on said heating element, there being a chamber formed between the outer shell and the inner liner around the bottom portion of the latter, whereby the heat reflected by said member is conducted upwardly into said chamber, and a pan removably disposed in said liner, said liner being slotted adjacent said chamber whereby the heat in said chamber is applied directly to the side wall of said pan.

9. An electric cooking utensil having a heating element disposed in the base thereof, an adjustable thermostatic switch arranged to control the current flowing in said element, an indicator hand or the like associated with said switch, and an index associated with said hand bearing the names of various articles of food arranged in graduated relation according to temperatures conducive to most efficient cooking thereof.

JAMES R. CROSS.